United States Patent [19]
Nagel

[11] 3,914,457
[45] Oct. 21, 1975

[54] PROCESS FOR PREPARING A PROTEIN-ENRICHED FOOD PRODUCT
[76] Inventor: Ludmilla V. Nagel, 3206 Liberty Ave., Alameda, Calif. 94501
[22] Filed: Apr. 10, 1974
[21] Appl. No.: 459,818

[52] U.S. Cl. .............. 426/589; 426/641; 426/646; 426/650; 426/652; 426/656
[51] Int. Cl.² .......................................... A23L 1/31
[58] Field of Search .......... 426/212, 274, 364, 371, 426/506, 104, 382, 137, 802, 185, 276

[56] References Cited
UNITED STATES PATENTS
3,482,998  12/1969  Carroll et al......................... 426/371
3,488,770  1/1970  Atkinson............................. 426/104

Primary Examiner—Hyman Lord
Attorney, Agent, or Firm—Townsend and Townsend

[57] ABSTRACT

A method is provided for combining dehydrated soy protein extrudate and animal protein such as heretofore utilized for human consumption and including edible protein derived from quadrupeds, crustaceans, poultry, fish and the like or combinations thereof. The product is prepared by first combining the dehydrated extrudate with heavily seasoned hot water. Thereafter the reconstituted, seasoned soy protein is added to the remaining ingredients including the animal protein and cooking of the combination completed prior to consumption. Storage of the combination can be accomplished either prior to or after completion of cooking by freezing. The resulting product exhibits the flavor and appearance of the naturally occurring meat ingredients rather than the flavor and appearance of soy protein.

3 Claims, No Drawings

PROCESS FOR PREPARING A PROTEIN-ENRICHED FOOD PRODUCT

BACKGROUND OF THE INVENTION

1. Field of the Invention

As the population of the world continues to multiply, the available supply of animal protein is becoming inadequate to provide the minimum human requirements on a per capita basis. For this reason, those concerned with nutrition have directed their efforts to developing substitutes or alternatives for such animal protein. Although the United States has become the leading producer of soy beans in the world, in the last half century, until recently this protein rich product has been used almost entirely for animal consumption. However, recent technological developments have been concentrated on tapping this infinite quantity of protein for human consumption. Thus, within the last 15 years, numerous procedures for extracting edible protein from soy beans have been developed. Many of the products created by such procedures have reached the market place, in a dehydrated form, as meat protein extenders.

2. Description of the Prior Art

Heretofore various dehydrated, protein-rich products have been isolated from soy beans. For example, U.S. Pat. No. 2,952,543 issued Sept. 30, 1960 describes a procedure for the manufacture of protein fibers using vegetable protein such as soy bean as the raw material. Similarly, precipitated isolated soy protein filaments in a rehydratable, dehydrated form have been produced by the method of U.S. Pat. No. 3,644,121, issued Feb. 22, 1972. Again, various vegetable proteins including soy bean have been treated to provide extrudate that can be rehydrated by cooking in a hot aqueous system such as boiling water to create a reconstituted product having a texture, appearance and coherence of cooked meat, such as described in U.S. Pat. No. 3,488,770 issued Jan. 6, 1970.

Thus, protein isolated from vegetables such as soy beans is readily available at only a fraction of the cost of a corresponding amount of animal protein. Yet broad consumer acceptance has not yet occured. The principle deterrent, to a significant human use of the various commercially available soy protein, resides in the undesirable flavor produced when such products are used with conventional food formulations, particularly where the soy protein is replacing a portion of or extending the animal protein.

SUMMARY OF THE INVENTION

This invention relates to the use of dehydrated extruded soy protein as an extender or substitute for various animal proteins in preparing a protein-enriched food product. More particularly, the present invention is directed to the discovery that when heavily seasoned hot water is employed to reconstitute extruded, dehydrated soy bean and the resulting rehydrated formulation incorporated as an extender for animal proteins, such as fish, crustaceans, poultry and quadrupeds, wherein the dehydrated soy protein is present in a major amount and at least one animal protein is present in a minor amount, the resulting combination is indistinguishable in taste and appearance from the extended animal protein per se. Furthermore, it has been found that the flavor of the soy bean is camouflaged even where the soy protein represents from 20–99% of the total protein, and in particular constitutes more than 75% of the total protein present.

It has now been found that dehydrated soy bean extrudate can be incorporated in hamburgers, meat balls, crab and shrimp spreads and the like, in volume amounts corresponding to up to 65% of the customary volume of meat, without adversely affecting the flavor or appearance of the end product. Similarly, dehydrated soy bean extrudate can be utilized to replace as much as 99% in particular from 51–95% of the total protein of the usual meat protein needed to formulate food items such as spaghetti sauce, chili, sloppy joes and the like, again without adversely affecting either the flavor or appearance of the end product.

The present invention can be carried out starting with any commercially available extruded dehydrated soy bean. Such products are generally bland, light buff in color, have excellent binding and absorption proterties and do not require special refrigeration techniques as ambient temperature storage is suitable when the product is retained in a substantially sealed container. However, particular advantages have been found to be obtained through use of a commercially available series of soy proteins identified as Supro.

Although it is not desired to be limited in any particular theoretical concept, it appears that the essence of the instant discovery resides in the need for substantially complete flavoring at the time of rehydration of the soy protein extrudate, prior to combining it with the animal protein, to prevent the reconstituted soy protein from absorbing and therefore being flavored by the fat during subsequent cooking and totally mask and eliminate any hint of soy flavor in the finished (cooked) product. It appears that when the dehydrated soy protein is substantially completely rehydrated it is virtually impossible to incorporate flavor therein. Thus, undesirable off-flavors that are present in fats, for example, are not retained. Such complete rehydration is only accomplished when hot water is employed. In this manner, the liquid fat normally released as the animal protein is being cooked, is prevented from being absorbed by the reconstituted extrudate. Contrasted therewith are the undesirable off-flavors that are created when reconstitution is accomplished with cold water that has not been heavily flavored or seasoned.

The process of this invention is accomplished by first adding seasoning and flavoring to hot tap water. The amount of flavoring or seasoning ingredients should be greater than that which would normally be used in cooking a formulation composed of only animal protein. It is essential that a substantial portion of the seasoning or flavoring be added to the hot water rather than subsequently to the animal protein portion. The total amount of seasonings can be as high as 0.1% or higher by total weight consumer product, without adversely affecting the flavor.

The term "animal protein" as used herein is intended to include the actual protein in the animal product as well as water and the other naturally-occurring nutritional components, such as minerals, vitamins, fats, carbohydrates. By hot water is meant water in the temperature range of 110° to 200°F that is normally available from the hot water faucet of a residential kitchen. Water at higher temperatures can also be employed without any dilatory effect even though rehydration will occur at a more rapid rate. The term "seasoning" or flavoring is intended to include spices such as pepper, garlic, sesame oil and the like, chicken or beef flavored bouillon cubes, herbs such as oregano, soups and the like, in addition to table salt.

Additional useful ingredients that can be added to such formulations include emulsifiers such as lecithin, tenderizers such as monosodium glutamate, antioxidants, stabilizers, color and certain dyes, food supplements such as vitamins or other physiologically acceptable food additives.

Once the seasoning has been added to the hot water, the dehydrated extruded soy protein is introduced. The volume ratio of extruded soy protein to hot water can range from about 1:3 to 1:1, more preferably 4:5 respectively. However, it has been found important to increase the ratio of water to extrudate as the ratio of extrudate to animal protein increases. In other words, as the degree of "extension" increases, reconstitution water requirements also increase. Thus, where it is desired to replace one half of the normal animal protein with soy protein, i.e., extend the animal protein by 50%, it is most advantageous to reconstitute the extrudate with water in the volume ratio of about 4:5.

When meat sauces are being prepared, it has been found desirable to provide a further increase in the amount of flavored or seasoned hot water employed for the reconstitution. Thus, the volume ratio of dry extrudate to animal protein can be 5:1 or greater. Under such circumstances, the ratio of extrudate to hot water can be 1:3 and the result ratio of rehydrated extrudate to animal protein at least 20:1. The resulting product having less than 6% animal protein has been found to retain the appetizing flavor of the animal protein while providing greater nutritional values. Thus, it will be apparent to one skilled in this art that the precise mathematical interrelationship between the volume of hot water employed for the rehydration and the specific volume ratio of extrudate to animal protein can vary broadly depending upon the end product desired. For example, the ratio of hot water to extrudate to animal protein can be in the range of 1:1:3 to 15:5:1.

Once the extrudate has absorbed all the available hot water, a time which will vary depending upon the temperature of the water and the ratio of extrudate to water, the rehydrated extrudate is combined with the animal protein and any additional ingredients that are normally included in the particular formulation being prepared. The formulation is then cooked to individual taste and served.

The following examples are offered by way of illustration of the present invention and not by way of limitation thereof. (All temperatures not otherwise specified are in Fahrenheit.)

EXAMPLE I

The following table recites the materials employed in the process:

Table I

| Ingredient | Hamburgers Amount |
| --- | --- |
| Ground Beef | 2 cups |
| Dehydrated Soy Protein Extrudate | 1 cup |
| Water | 1 cup |

The water was heated to 130°F and seasoning consisting of 1 Bouillon cube, ½ tablespoon of black pepper and ½ tablespoon of salt dispersed therein. The extrudate was immediately added to the hot water and the mixture allowed to stand until all of the water was absorbed thereby. The time required for absorption was about 5 minutes. The reconstituted soy protein isolate was mixed with the ground beef, shaped into patties and fried to the degree desired. The resulting product demonstrated a flavor and appearance indistinguishable from hamburgers formulated entirely of ground beef.

EXAMPLE II

Meatloaf

Example I was repeated, using a combination of ground beef and ground turkey. The water was flavored with ½ cup tomato sauce and 1 teaspoon beef base, and seasoned with $\mu$ teaspoon ground pepper. The formulation was shaped into a loaf and baked for about 40 minutes in a 350°F oven. Again the resulting meatloaf was indistinguishable from similar meatloafs formed entirely from animal protein.

Although the foregoing invention has been described in some detail by way of illustration and example for purposes of clarity of understanding, it will be obvious that certain changes and modifications may be practiced within the scope of the appended claims.

What is claimed is:

1. A process for preparing a protein-enriched food formulation for human consumption, comprising: incorporating seasoning in an amount at least as high as 0.1% of the total weight of resulting product, with a first volume of hot water having a temperature in the range of 110–200°F., said seasoning comprising table salt and a seasoning selected from the group consisting of pepper, garlic, sesame oil, chicken flavored bouillon cubes, beef flavored bouillon cubes, oregano and soups; substantially completely reconstituting and completely flavoring a corresponding second volume of dehydrated extruded soy protein by allowing all of said first volume of seasoned hot water to be absorbed by said second volume of soy protein whereby no further flavoring can be absorbed by the reconstituted soy protein combining said reconstituted soy protein with additional ingredients including a third volume of at least one ground animal protein; and cooking said combination, the ratio of said first, second and third volumes being in the range of 1:1:3 to 15:5:1.

2. A process in accordance with claim 1 wherein the amount of said soy protein represents from 20–99% of the total protein, the remainder being said animal protein.

3. A process in accordance with claim 1 and including the additional step of freezing said combination for storage thereof.

* * * * *